US007398009B2

(12) United States Patent
Candelore et al.

(10) Patent No.: US 7,398,009 B2
(45) Date of Patent: Jul. 8, 2008

(54) METHOD AND APPARATUS FOR MANAGING VIDEO STORAGE

(75) Inventors: Brant Candelore, Escondido, CA (US); Yuko Nishikawa, La Jolla, CA (US); Michael Bergeron, Poway, CA (US); Ron Diaz, San Diego, CA (US); Dayan Golden, San Diego, CA (US); Andy Proehl, San Francisco, CA (US); Himgan Wibisono, San Francisco, CA (US); Philip McKay, San Francisco, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 795 days.

(21) Appl. No.: 10/808,134

(22) Filed: Mar. 24, 2004

(65) Prior Publication Data

US 2005/0213928 A1    Sep. 29, 2005

(51) Int. Cl.
*H04N 7/00* (2006.01)
*H04N 5/91* (2006.01)

(52) U.S. Cl. .......................................... 386/94; 386/46
(58) Field of Classification Search ................ 386/83, 386/46, 94, 52, 124
See application file for complete search history.

(56) References Cited

U.S. PATENT DOCUMENTS

2004/0244030 A1* 12/2004 Boyce et al. ................. 725/25

* cited by examiner

*Primary Examiner*—Robert Chevalier
(74) *Attorney, Agent, or Firm*—Trellis Intellectual Property Law Group, PC

(57) ABSTRACT

A method and apparatus for tracking the viewing of stored video content. A video event is recorded, such as with a personal video recorder, and is subsequently displayed on a display screen having identified thereon at least one user who is to view the recorded video event. The user enters an option (e.g., "OK to Erase") associated with the displayed recorded event. The entered option is displayed on the display screen so subsequent users will know the desired option of the prior user. A machine-readable medium having stored thereon instructions for recording and displaying a video event, as well as instructions for receiving and displaying an option associated with the displayed recorded event.

17 Claims, 4 Drawing Sheets

| EVENT 24 | DURATION 26 | DATE 28 | OK to Erase 30 JOHN 30a 30b | OK to Erase 32 DAD 32a 32b | OK to Erase 34 MOM 34a 34b |
|---|---|---|---|---|---|
| Mail Call | 00:30 | 05/26 | 36 | | |
| Mail Call | 00:30 | 05/26 | | | |
| Stargate | 00:30 | 05/25 | | 36 | |
| Down to Earth | 01:30 | 05/25 | | | 36 |
| Real Scorpion King | 02:00 | 05/20 | 36 | | |
| Mail Call | 00:30 | 05/18 | | | |
| History's Mysteries | 00:30 | 05/13 | | | |

RECORDED EVENTS 20, 22

P

New Fields

*Figure 2*

The squares are the members of the family that registered interest in the content.

METHOD AND APPARATUS FOR MANAGING VIDEO STORAGE

BACKGROUND OF THE INVENTION

1. Field of Invention

Embodiments of the present invention broadly relate to storage devices, such as video storage devices. More specifically, embodiments of the present invention provide for a method and apparatus for managing storage of videos on a video storage device, such as a personal video recorder.

2. Description of the Background Art

Video recorders are important for controlling people's ability to view programs which otherwise would not be seen due to conflicts with the time of broadcast of an event. Thus, video recorders enable people to no longer be hostage to any particular broadcast schedule. Unfortunately, members of a household often do not have the same time schedule for viewing a recorded program. Children often come home early from school and have some discretionary time to play games or watch programs on TV before doing homework and going to bed. Professional adults often come home late from work, sometimes after the children have gone to bed.

It is well known that there is a finite amount of storage on any video recorder, particularly a personal video recorder (PVR). After a personal video recorder has recorded a program, there is often no more available storage capacity to record another program. Unviewed content must be erased in order to make room for new content.

One of the difficulties in managing content on a personal video recorder is that there is no suitable means for informing a member of a household of that a particular recorded event has been viewed by other members of the household. If a member of a household knew that all other members of the household have seen a particular recorded event, then the member could erase the recorded event after seeing it in order to free up video storage area for recording another event.

Another difficulty in managing content on a personal video recorder is that there is no suitable means for a member of a household to indicate to other members of the household that a particular recorded event is to be saved after being seen by the member. Many times a member of a household does not have time to view the entire recorded event at one time, so it would be desirable to save the recorded event in order for the member to be able to finish seeing it at another time. Also, a member after viewing the entire recorded event may want to save the recorded event for viewing again at another time.

SUMMARY OF EMBODIMENTS OF THE INVENTION

Embodiments of the present invention provide a method for tracking the viewing of stored video content comprising recording a video event, displaying the recorded video event on a display screen having identified thereon at least one user who is to view the recorded video event, entering by the user an option associated with the displayed recorded event, and displaying the option on the display screen.

Embodiments of the present invention further provide a machine-readable medium having stored thereon instructions for: recording a video event, displaying the recorded video event on a display screen having identified thereon at least one user who is to view the recorded video event, receiving an option associated with the displayed recorded event, and displaying the option on the display screen.

Embodiments of the present invention also provide an apparatus for recording a video event comprising means for recording a video event; means for receiving from the user an option associated with the recorded event; and means for displaying the recorded video event, the at least one user who is to view the recorded video event, and the option entered by the user and associated with the recorded video event.

Further embodiments of the present invention provide an apparatus for recording a video event comprising a recorder for recording a video event, an option associated with the recorded event and received from a user, and a display screen for displaying the recorded video event, the at least one user who is to view the recorded video event, and the option entered by the user and associated with the recorded video event.

Further embodiments of the present invention also provide a display screen comprising a displayed recorded event, a displayed name for the recorded event, at least one displayed name of a user, and a displayed entry associated with the displayed name of the user.

These provisions together with the various ancillary provisions and features which will become apparent to those artisans possessing skill in the art as the following description proceeds are attained by devices, assemblies, systems and methods of embodiments of the present invention, various embodiments thereof being shown with reference to the accompanying drawings, by way of example only, wherein:

BRIEF DESCRIPTION OF THE DRAWINGS

FIG. 2 is a diagram of a display screen listing recorded video events and users who are to view the recorded video event and who are to enter an option (e.g., erase the recorded video event after viewing) with respect to each recorded event.

DETAILED DESCRIPTION OF EMBODIMENTS OF THE INVENTION

Figure 1:
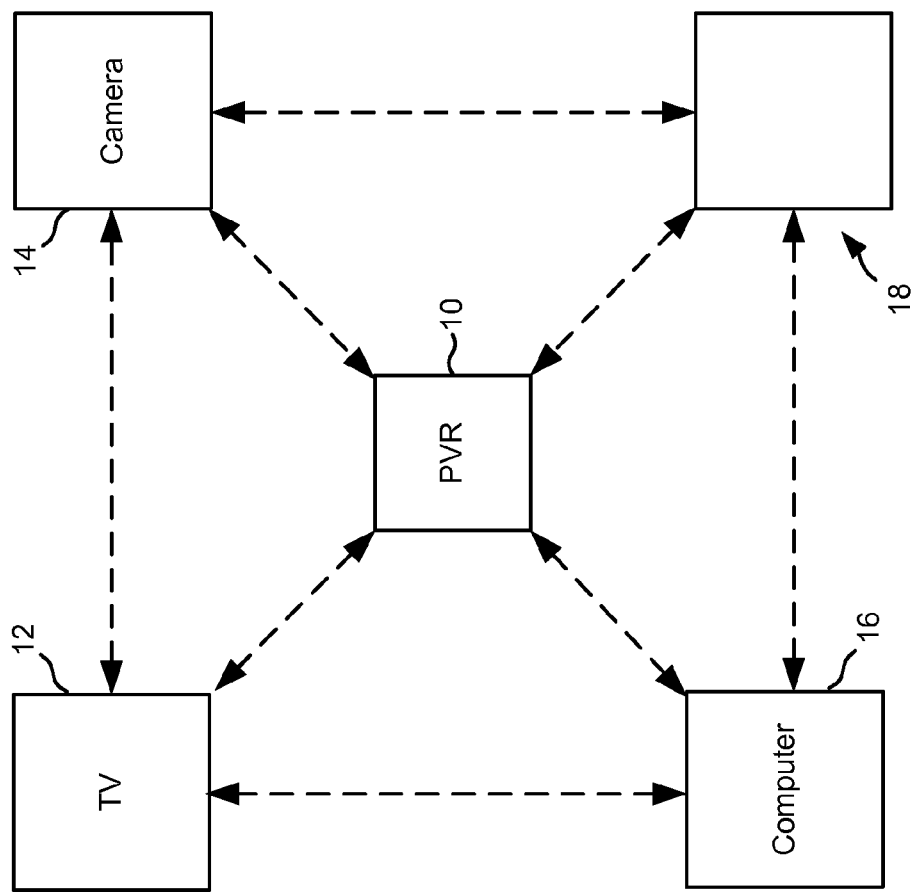
FIG. 1 is a schematic diagram of a PVR communicatively cooperating with a TV and/or a computer and/or a camera for recording a video event.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "video recorder" for purposes of embodiments of the present invention may broadly be any suitable video recorder which is capable of functioning for purposes of the embodiments of the present invention. More specifically, the video recorder may be any suitable video storage device for recording and storing any suitable video event, whether a still-picture video or a moving-picture video. The video recorder may function with any suitable apparatus which is capable of producing and/or transmitting a video event, such as a computer, a camera, or any combination of a TV, a computer, and a camera. Thus, the method for tracking and/or managing a video event for embodiments of the present invention would be applicable for any video recorder communicatively functioning with any suitable video producing and/or video transmitting apparatus.

In an embodiment of the invention, the video recorder comprises a personal video recorder. A "personal video recorder" (PVR) for purposes of embodiments of the present invention may be any suitable PVR, such as a PVR which is an interactive TV recording device. Vendors and media often times refer to a PVR by: digital video recorder (DVR); personal TV receiver (PTR); personal video station (PVS); and hard disk recorder (HDR).

Like the familiar VCR, a PVR records and plays back television programs, but, unlike the VCR, it stores the programs in digital (rather than analog) form. Like a VCR, a PVR has the ability to pause, rewind, stop, or fast-forward a recorded program. Because the PVR can record a program and replay it almost immediately with a slight time lag, what appears to be live programs may be manipulated as though they were recorded programs (which they actually are). A PVR's capabilities include time marking, indexing, and non-linear editing. The PVR encodes an incoming analog video data stream as MPEG-1 or MPEG-2. The PVR can also receive digital content such as from terrestrial, cable and DBS broadcasts. In either the incoming analog or digital case, it stores the digital content on a hard disk within a device that looks much like a VCR.

A PVR may include a subscriber service that enables such activities as: (i) searching for shows according to type (movies or baseball games, for example); (ii) choosing among video-on-demand (VOD) options; or (iii) doing shopping or banking. A commercial available PVR product is sold under the product I.D. SVR-2000 by Sony Corporation. A "personal video recorder" for purposes of embodiments of the present invention includes products that offer similar functionality, but are software-based (such as SnapStream Personal Video Station) or network-based.

A "computer" for purposes of embodiments of the present invention may be any processor-containing device, such as a mainframe computer, a personal computer, a laptop, a notebook, a microcomputer, a server, or any of the like. A "computer program" may be any suitable program or sequence of coded instructions which are to be inserted into a computer, well know to those skilled in the art. Stated more specifically, a computer program is an organized list of instructions that, when executed, causes the computer to behave in a predetermined manner. A computer program contains a list of ingredients (called variables) and a list of directions (called statements) that tell the computer what to do with the variables. The variables may represent numeric data, text, or graphical images. If a computer is employed for capturing and/or storing a video event, the computer would have suitable instructions (e.g., source code) for allowing a user to track and manage the video content stored in the computer.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. The computer readable medium may have suitable instructions for allowing a user to track and manage stored video content.

Referring now to FIG. 1, there is seen a PVR 10 which may interact with, or function in combination with, a TV 12, a camera 14, a computer 16, or any other suitable similar device, generally illustrated as 18. Thus, for various embodiments of the present invention, the PVR 10 may capture live video events from any suitable source, such as a computer, a camera, a TV, a DVD, a WEB CAM, or any combination of the foregoing (e.g., any combination of the PVR with a TV and a computer), or any other suitable source. As previously indicated, the video event may be a still-picture video or a moving-picture video. The display screen for embodiments of the present invention any be any suitable display screen, such as a display screen of a computer, a TV screen, a program timer of a personal video recorder, or any other suitable display screen. Thus, the display screen employed for tracking and for managing a video event may be one or more display screens for any apparatus for tracking and/or managing a video event in accordance with embodiments of the present invention.

Referring now to FIG. 2, there is seen a display screen, generally illustrated as 20. The display screen 20 comprises a plurality of fields, generally illustrated as 22, from a directory of a video recorder. Fields 22 have been previously entered or pre-programmed by the user into the memory of a directory of the video recorder. As shown in FIG. 2, fields 22 include event 24, duration 26, date 28, and user(s) 30, 32 and 34. The event 24 comprises video event(s), such as by way of example only, "Mail Call," "Stargate," "Down to Earth," "Real Scorpion King," and "History's Mysteries." Date 28 represents the date that any video event was recorded. Fields 30, 32 and 34 include the users who are to view the recorded video events, and an option associated with the recorded video events.

The option for the recorded event may be any option, such as by way of example only: (i) the user has seen the recorded video event and has no interest in seeing it again (i.e., the event may be erased); (ii) the user has seen the recorded video event but would like to save it for viewing again (i.e., the recorded video event would be protected); or (iii) the user has not seen the recorded video event in its entirety and would like to save it for further viewing (i.e., again the recorded video event would be protected). As will be further explained hereinafter, if all users have seen the recorded video event and have expressed no further interest in seeing the recorded video event, or have indicated that it is acceptable to erase the recorded video event, the recorder may be pre-programmed to automatically erase the recorded video event after the last user has viewed it. Alternatively, the recorder may be pre-programmed such that the recorded video event has to be manually erased by the last user. If any particular user has seen the recorded video event but would like to save it for viewing again, or if any particular user has not seen the recorded video event in its entirety and would like to save it for further viewing, the recorded video event may be saved by the particular user, no matter if all other users have indicated a desire to have the recorded video erased.

Continuing to refer to FIG. 2 for an embodiment of the invention, fields 30, 32, and 34 include names 30a, 32a, and 34a of a household, such as "John," "Dad," and "Mom," respectively, as well as options 30b, 32b, and 34b, "OK to Erase." After a particular user has viewed a recorded video event, the user would then enter into the directory of the video recorder an appropriate indicia representing that it is acceptable to erase the recorded video event (i.e., "OK to Erase"), reflecting that the user does not wish to view any portion of the recorded video event again. In FIG. 2 the indicia representing that the recorded video event may be erased comprises a check mark 36.

In another embodiment of the invention, the video recorder may be pre-programmed such that after a user has seen the recorded video event, an erase indicator (e.g., erase indicator 36) for the recorded video event would automatically be entered under the name of the user. Alternatively, the video recorder may be pre-programmed such that the user would have to manually enter the erase indicator. As previously suggested, after all users have viewed the particular video event and an erase indicator has been associated with the particular recorded, the video recorder may be pre-programmed to automatically erase the seen recorded event; or alternatively, the last user would have to erase the recorded video event.

Any erase indicator associated with a recorded video event may be overridden to protect the recorded video event from erasure. Thus, any particular user could enter or register a protective indicator (e.g., a box-shaped mark) for any recorded video event. The protective indicator may be entered by a particular user even if the user has seen no portion of the recorded video event; thus, other users would be forewarned that a particular recorded video event is especially of interest to that particular user since he or she has entered a protective indicator without even haven seen the recorded video event. Alternatively, the protective indicator may be entered by a particular user after having seen the recorded video event and after an erase indicator has been entered, either automatically or manually, against the recorded video event. The protective indicator may be entered around the erase indicator, such as a box-like figure or mark circumscribing the erase indicator. The recorded event could then not be erased even after all remaining users have seen the recorded video event and have entered an erase indicator for it. As long as a recorded video event is being protected by a protective indicator from any particular user, the recorded video event can not be erased.

Some households are very large, and the indicator may not in fact be respected by one of the members. A different member might simply un-check the protective indicator for the member who checks it in the first place. In such instances, it is envisioned that the indicator from a particular use may be further protected from deletion through the use a user password. To un-check the protective indicator for a particular user, that user's password would need to be entered.

Figure 3:
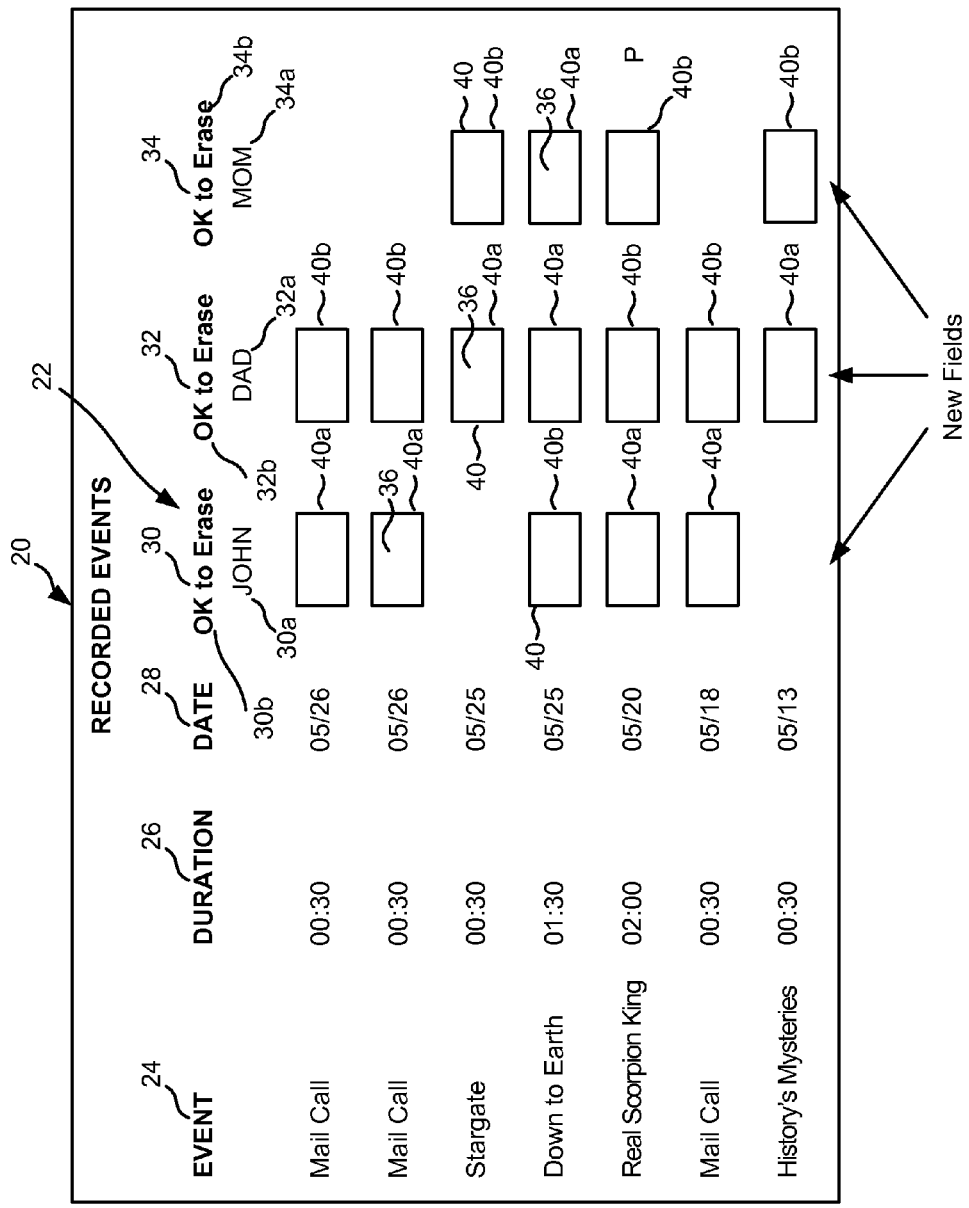
FIG. 3 is a diagram of the display screen of FIG. 2 after users have registered an interest in the content of the recorded event.

Referring now to FIG. 3, there is seen a schematic diagram of the display screen 20 of FIG. 2 after users have registered an interest in the content of the recorded event under event 24. Registered interest in the content of any particular recorded event comprises box-like indicia 40. Box-like indicia 40a circumscribe the erase indicator, check mark 36, reflecting that a particular user has seen the recorded video event, but has decided to protect the recorded video event even though the erase indicator, check mark 36, was automatically entered by the video recorder or was manually entered by the user. Box-like indicia 40b reflects that a particular user has not seen the recorded video event yet, or has partially or entirely seen the recorded video event, but has decided to protect the recorded video event due to an interest in it. Thus, by way of example only, for the event 24 titled "Real Scorpion King," user with the name "John" has seen "Real Scorpion King," but has decided to protect this recorded video event by circumscribing the check mark 36 with box-like indicia 40a, which may be readily put into the directory of the video recorder by any appropriate signal or entry from user "John." As indicated, check mark 36 may have been automatically entered by the video recorder after user "John" has finished seeing "Real Scorpion King," or user "John" manually entered the check mark 36 after he finished see "Real Scorpion King." Users by the name of "Dad" and "Mom" have each entered box-like indicia 40b for "Real Scorpion King," reflecting that "Dad" and "Mom" have not yet seen "Real Scorpion King," or have partially seen "Real Scorpion King," but have decided to protect "Real Scorpion King" due to an interest in it, such as a desire to finish seeing "Real Scorpion King" or to see "Real Scorpion King" again.

Figure 4:
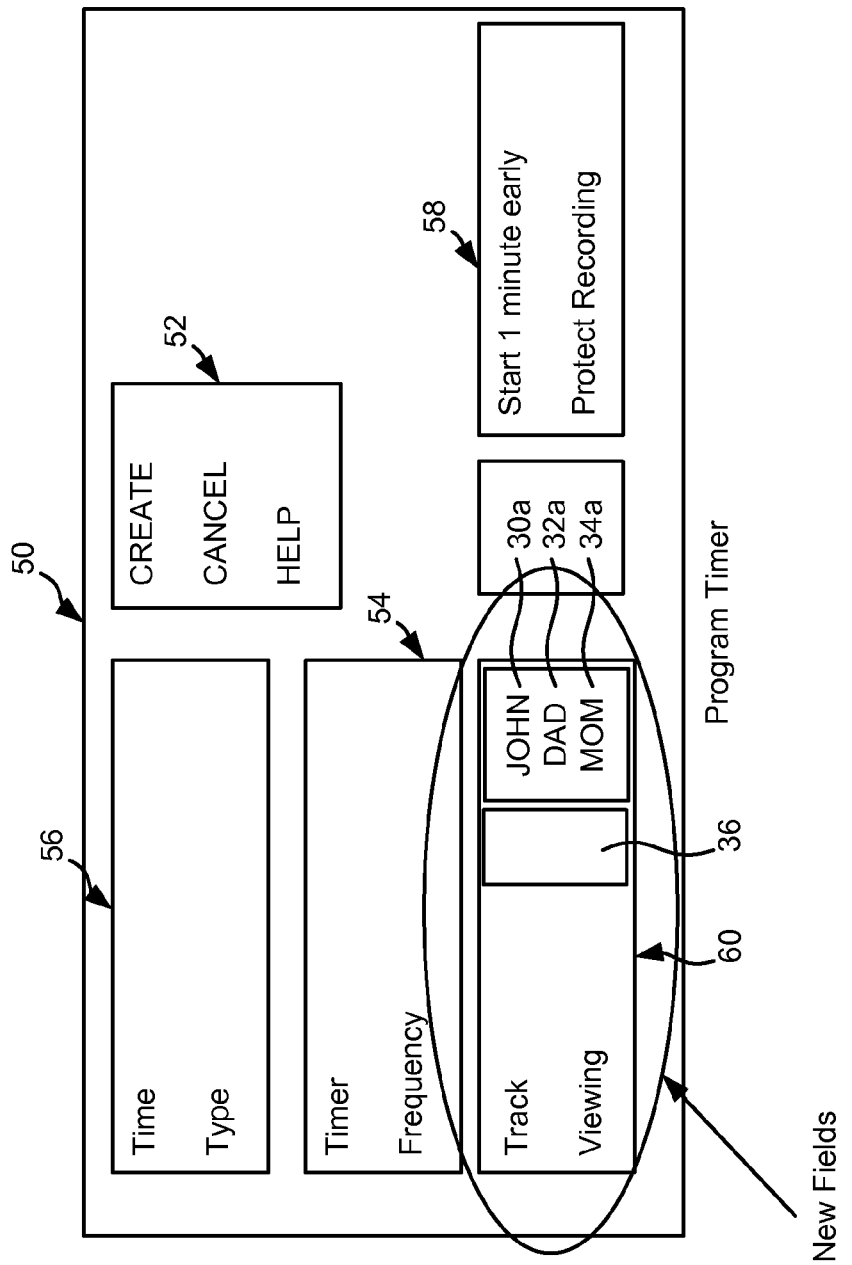
FIG. 4 is a front elevational view of a program timer having a display screen which displays and tracks users who have an option for a particular recorded event.

Referring now to FIG. 4 there is seen a program timer, generally illustrated as 50, having video recorder information, such as available commands 52, video timing availabilities 54, time of day display 56, video recording commands 58 (e.g., start recording video event 1 min. early 58a, and protect the recorded video event 58b), and video tracking information 60 which displays the video tracking and video option information that are displayed on the display screen 20, such as, by way of example only, check mark 36 (i.e., "OK to Erase") and user's names 30a (i.e., "John"), 32a (i.e., "Dad") and 34a (i.e., "Mom"). Thus, the video tracking and video managing information may be displayed at a number of locations, such as on display screen 20 and in the program timer 50. The automated erasure of recorded video programs in order to allow the recording of new video programs may be conditioned on user entries. By way of example, and as previously indicated, if users have expressed an interest in viewing certain content of a recorded video programs, that content can be treated as being "protected" until all users have checked their appropriate fields associated with their names. Therefore, in FIG. 4, until "Dad" places a check mark 36 next to his name, the particular video recorded event is protected.

By practice of embodiments of the present invention, there is provided an apparatus and method for tracking the viewing of stored video content. A video event is recorded, such as with a computer or a personal video recorder. The recorded video event may be displayed on a display screen having identified thereon at least one user who is to view the recorded video event. The user may at any time enter an option (e.g., "OK to Erase") associated with the displayed recorded event. Other users who are to view the recorded video event may view the option recorded by a prior user who has seen the recorded video event.

By practice of embodiments of the present invention, there is provided a machine-readable medium having stored thereon instructions for performing any of the video tracking and video managing functions for embodiments of the present invention. By way of example only, the machine-readable medium may comprise instructions for: recording a video event, displaying the recorded video event on a display screen having identified thereon at least one user who is to view the recorded video event, receiving an option associated with the displayed recorded event, and displaying the option on the display screen.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for tracking the viewing of stored video content comprising:
    recording a video event;
    displaying the recorded video event on a display screen having identified thereon at least one user who is to view the recorded video event;
    entering by the user an option associated with the displayed recorded event, wherein the option includes a protective indicator to indicate that erasing of the recorded video is prevented; and
    displaying the option on the display screen.

2. The method of claim 1 wherein said recording a video event comprises recording a video event with a video recorder.

3. The method of claim 2 wherein said video recorder comprises a personal video recorder.

4. The method of claim 1 wherein said option comprises an indicator that the video event has been viewed.

5. The method of claim 1 wherein said at least one user comprises a first user and a second user.

6. The method of claim 5 wherein said entering an option comprises said first user entering an indicator that the recorded video event may be erased by the second user.

7. The method of claim 6 additionally comprising erasing by the second user the recorded event.

8. The method of claim 1 wherein said recording a video event comprises recording the video event with a computer.

9. The method of claim 1 wherein said entering an option comprises registering an interest in the content of the recorded video event.

10. The method of claim 1 wherein said protective indicator comprises a box-like mark.

11. The method of claim 1 additionally comprising protecting the displayed option.

12. The method of claim 11 additionally comprising releasing the protection from the displayed option.

13. The method of claim 1 additionally comprising automatically erasing the recorded video event after the user has viewed the recorded video event.

14. The method of claim 1 additionally comprising display the option on a program timer of a personal video recorder.

15. A computer readable medium encoded with computer executable intrusions having stored thereon instructions for:
    recording a video event;
    displaying the recorded video event on a display screen having identified thereon at least one user who is to view the recorded video event;
    receiving an option associated with the displayed recorded event, wherein the option includes a protective indicator to indicate that erasing of the recorded video is prevented; and
    displaying the option on the display screen.

16. An apparatus for recording a video event comprising:
    means for recording a video event;
    means for receiving from the user an option associated with the recorded event; and
    means for displaying the recorded video event, the at least one user who is to view the recorded video event, and the option entered by the user and associated with the recorded video event, wherein the option includes a protective indicator to indicate that erasing of the recorded video is prevented.

17. An apparatus for recording a video event comprising:
    a recorder for recording a video event;
    an option associated with the recorded event and received from a user; and
    a display screen for displaying the recorded video event, the at least one user who is to view the recorded video event, and the option entered by the user and associated with the recorded video event, wherein the option includes a protective indicator to indicate that erasing of the recorded video is prevented.

* * * * *

UNITED STATES PATENT AND TRADEMARK OFFICE
CERTIFICATE OF CORRECTION

PATENT NO.         : 7,398,009 B2
APPLICATION NO.    : 10/808134
DATED              : July 8, 2008
INVENTOR(S)        : Candelore et al.

It is certified that error appears in the above-identified patent and that said Letters Patent is hereby corrected as shown below:

Column 4, line 12 delete "any be" and add --can be--

Column 5, line 23 delete "haven" and add --haven't--

Column 5, line 39 after "use" add --of--

Column 5, line 64 delete "see" and add --seeing--

Column 6, line 21 delete "programs" and add --program--

Column 8, line 29, claim 14 delete "display" and add --displaying--

Column 8, line 43, claim 16 should be indented

Column 8, line 44, claim 16 should be indented

Column 8, line 46, claim 16 should be indented

Column 8, line 53, claim 17 should be indented

Column 8, line 54, claim 17 should be indented

Column 8, line 56, claim 17 should be indented

Signed and Sealed this

Nineteenth Day of May, 2009

JOHN DOLL
*Acting Director of the United States Patent and Trademark Office*